Sept. 8, 1959  W. A. WEISS ET AL  2,903,644
DYNAMIC MUTUAL CONDUCTANCE TUBE TESTER
Filed Oct. 28, 1955
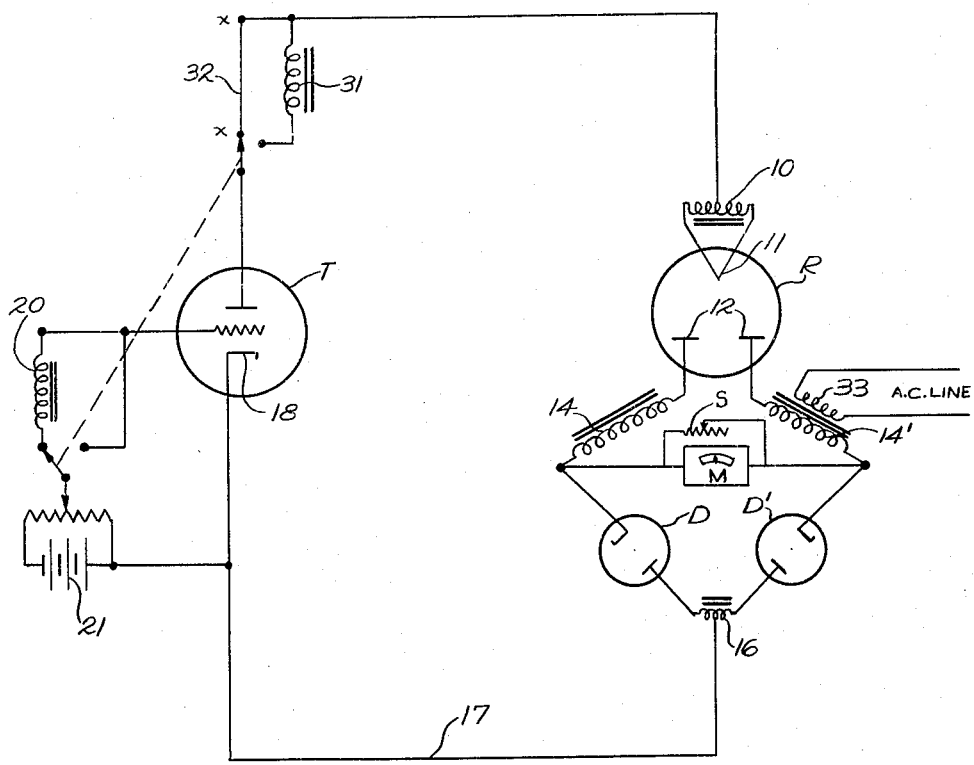
SECONDARY WINDINGS 10, 14, 14', 16, 20 AND 31
ALL ENERGIZED BY PRIMARY 33.
INVENTORS
WALTER A. WEISS
DAVID S. WISE
BY
J. D. Douglass
THEIR ATTORNEY

United States Patent Office 2,903,644
Patented Sept. 8, 1959

2,903,644

DYNAMIC MUTUAL CONDUCTANCE TUBE TESTER

Walter A. Weiss, Euclid, and David S. Wise, Cleveland, Ohio, assignors to The Hickok Electrical Instrument Company, Cleveland, Ohio Application October 28, 1955, Serial No. 543,344

11 Claims. (Cl. 324—26)

This invention relates to apparatus for testing electronic tubes and more particularly to a dynamic mutual conductance type of tube tester.

It has been appreciated for a considerable length of time that if a true indication of the quality of a vacuum tube is to be had, it is necessary that the dynamic rather than the static characteristics be considered. This has led to the development of a type of tube tester known in the art as a dynamic mutual conductance type of tube tester of the character shown in the Barnhart Patent No. 1,999,858.

This type of tube tester is arranged to provide an alternating current signal to the grid of the tube under test in the presence of the required bias. The signal on the grid produces a change in plate current in microamperes which, when divided by the grid signal in volts results in a quotient which expresses in micromhos the mutual conductance of the tube.

Although tube testers embodying the concepts of the above patent have been successful and are recognized by those in the art as being most practical for indicating the condition of a vacuum tube, with the advent of some of the newer types of tubes which draw relatively small current, difficulty was encountered in providing an accurate measurement of the characteristics of the tube, due to the lack of sensitivity of the measuring circuit. Although meters could be installed in the measuring circuit that were extremely sensitive they lacked the rugged qualities of the less sensitive meters and therefore were not the most desirable particularly for use in the field; furthermore as the meter is made more sensitive it results in an increase in impedance which tends to defeat the purpose of reducing the impedance in the measuring circuit of the tube under test.

By the present invention we are able to provide a single instrument, wherein the sensitivity may be adjusted, so that practically all of the commercially known types of receiving tubes manufactured today, regardless of the size or current handling capacities, may be measured by a single instrument, capable of providing an appreciably much higher degree of accuracy, even when measuring low current handling or low mutual conductance tubes.

By reference to the Barnhart patent, particularly Fig. 1, it will be noted that, upon the application of an alternating potential to the grid of the tube under test, the rectifier tube which supplied the direct current to the anode of the tube under test, passes currents from each of its anodes through the windings, first through one winding and then through the other, depending upon the polarity of the anode. The difference in the currents due to the static bias on the grid of the tube under test being relatively negative at one cycle and relatively positive on the other half of the cycle, and, which is the measure of mutual conductance, was measured by a meter shunted across a center tapped resistance which center tap returned to the cathode or filament of the tube under test. Therefore the current flowing away from the anodes of the rectifier tube was divided, part of it going through the meter and part of it through a resistance which shunted the meter. At no time did all of the current flow through the meter and therefore a meter made sensitive enough to read very small currents contained high resistance which defeated the purpose, which was to reduce the resistance in the measuring circuit, it being understood that in that circuit it was desirable that the resistance in the anode circuit of the tube under test be as low as possible. By the present invention we have provided an improvement over the above-mentioned circuit which enables all of the current to be passed through and measured by the meter and still retain the advantage of the bridge-type circuit of the prior art and obtain a low resistance in the anode circuit of the tube under test.

In the drawings the figure shows a simplified schematic circuit illustrating an application of our invention.

As can be seen the figure illustrates a tube T under test which, in this instance, is depicted as a triode. It will be appreciated however that the invention contemplates the use of the invention in testing tubes other than triodes including all of the multi-element vacuum tubes.

The anode of the tube T under test is connected to the center tap of the transformer winding 10 which energizes the filament 11 of the rectifier tube R. Each anode 12 of the rectifier R connect to the separate ends of each of the separate windings 14 and 14' which supply voltage to the anodes in equal amount but alternate phase. The rectifier thus supplies the tube T with the suitable anode voltage in the proper polarity. A meter M is connected across the other ends of the windings 14—14'; it may be shunted by a variable resistance S which may be used, when desired, to shunt some of the current around the meter to adjust its sensitivity to the desired value. The same ends of the windings 14—14' which are connected to the meter are also connected through separate unilateral conducting devices D and D' to the ends of a winding 16. The winding 16 is connected by a center tap 17 to the cathode or filament 18 of the tube T.

A winding 20 is connected to the grid of the tube T and through an adjustable bias 21 to the cathode.

It should be pointed out that the windings may all be energized from a common primary 33 so that a known phase relationship of the voltage wave exists at the grid of the tube under test, at the anodes of the rectifier, and, at the ends of the winding 16 in the cathode circuit of the tube T under test.

The unilateral conducting devices may be of the semiconductor type including germanium, selenium and silicon of which one manufactured by General Electric Company and known in the trade as 1N91 has been found to be satisfactory, or suitable vacuum tube types which preferably should be one of those devices that have a low forward resistance, in the interest of reducing the impedance in the anode circuit of the tube under test, and having a high inverse resistance in the interest of reducing the shunting effect of the meter. It is also apparent that switch means in the form of mechanically or magnetically operated contacts may be used in the place of the diodes D and D'.

In operation if a signal is applied to the grid of tube T, and it may be and preferably is a sine wave signal of a predetermined value, the grid is driven alternately more negative and less negative to overcome the bias and to set up an alternating current signal in the anode. Since the anode is receiving its voltage from the rectifier R the current is drawn alternately through the coils 14 and 14'. If the signal on the grid of tube T is in the negative phase this should occur at the same time as a predetermined one of the anodes of tube R is positive. If it be considered that the anode connected to the winding 14 is positive at this time, there is a decrease in current. The current that does flow will flow through the meter M and by way of the diode D' the anode of which is now positive, from the transformer winding 16 and through the lead 17 back to the cathode of tube T.

On the other or positive half of the signal, since all the windings are energized in the opposite phase, the grid is driven more positive and more current flows in the anode circuit through the rectifier R and through the coil 14' thence through the meter M and diode D back to the cathode through lead 17. The anode of the diode D is positive at this time.

Since mutual conductance by the formula:

$$gm = \frac{\Delta Ip}{\Delta Eg}$$

is considered as in incremental change in plate current caused by a corresponding incremental change in grid voltage, and since the meter deflection is in proportion to the incremental change in plate current, the incremental change in grid voltage can be established and measured. The meter in this instance can be calibrated in micromhos of the tube under test. It should be pointed out that the meter may be one of the galvanometer type and is one which does not respond to rapid fluctuation, such as an alternating current, but presents a steady reading of the current.

Because of the diodes D and D', and the winding 16, which provides a threshold bias for each diode in the proper polarity and phase, the current must all pass through the meter and either one or the other diode and at no time does the non-conductive diode provide a shunt path for current. Thus a meter may be used which will measure these small currents since all of the current is available to the meter. As previously stated where the currents are normally large the sensitivity of the meter may be varied by varying the amount of resistance in shunt therewith, this control being for selecting the desired range.

Thus we have provided an instrument which may measure the dynamic mutual conductance of a large variety of tubes including those drawing very small currents or having very low mutual conductance, and one which is extremely accurate, rugged and particularly useful, in the field.

Normally the measurement of the mutual conductance parameter is the desired result to be obtained. Should, however, it be desired to measure the plate resistance parameter, the signal on the grid may be removed by removing the signal source from the grid and connecting the grid through an adjustable bias to the cathode. At the same time a signal is injected in the anode circuit by means of a winding 31 which is inserted at the point x—x in place of the jumper 32. It will be appreciated that the same control for the switch which opens the anode circuit the tube under test and inserts the winding 31 can be used to operate the switch which removes the winding 20 and connects the grid directly to the bias supply 21. This places an alternating current signal in series with the anode circuit in the proper phase.

Since plate resistance by the formula:

$$rp = \frac{\Delta Ep}{\Delta Ip}$$

is considered as incremental change in plate voltage divided by the incremental change in plate current and since the incremental change in plate voltage can be established as voltage delivered by the signal at 31, and since the incremental change in plate current, as described, is measured by meter M, the meter can then be calibrated in terms of plate resistance of the tube under test.

The rectifier R has been described as a vacuum tube type, it can be replaced with any other devices or combination of devices which may not necessarily be a vacuum tube, such as any suitable type of rectifier or rectifiers.

Having thus described our invention in an embodiment thereof, we are aware that numerous and extensive departures from the disclosure will be apparent to those versed in the art without departing from the spirit or scope of the invention as defined by the appended claims.

We claim:

1. A tube testing device including means for supplying anode current to the tube under test including rectifier means for supplying current of one sign to the tube under test wherein alternating current supply means is provided connected to the rectifier by discrete windings to supply alternating current in opposite phase relationship, and means for connecting said supply means to the emitting element of the tube under test comprising a pair of unilateral conducting means each of which has one end connected to said supply means and its other end connected to said emitting element, and meter means connected across said one ends of the unilateral conducting means and means for supplying an alternating current signal to the control element of the tube under test.

2. A tube testing device including means for supplying anode current to the tube under test including a rectifier having its cathode connected to the anode of the tube under test, said rectifier having a pair of anodes and alternating current supply means connected to said anodes for supplying current to said anodes separately from each other and in opposite phase relationship and means for connecting said current supply means to the emitting element of the tube under test comprising at least a pair of unilateral conducting means each of which has one end connected to said supply means and its other end connected to said emitting element, and meter means connected across said one ends of the unilateral conducting means and means for supplying an alternating current signal to the tube under test.

3. A voltage supply means for supplying voltage and measuring current supplied to a circuit comprising a rectifier, alternating current supplying means connected to said rectifier and comprising at least two discrete portions for supplying current to the rectifier in alternating and opposing phase relations, a current indicator meter connected to the ends of said current supplying means opposite to the connections to the rectifier and means for supplying a current return path from the current supplying means to the voltage and current supplied circuit comprising at least a pair of unilateral conducting devices each one of which is connected to the same ends of said current supply means as the meter.

4. A voltage supply means for supplying voltage and measuring current supplied to a circuit comprising a rectifier, alternating current supplying means connected to said rectifier and comprising at least two discrete portions for supplying current to the rectifier in alternating and opposing phase relations, a current indicator meter connected to the ends of said current supplying means opposite to the connections to the rectifier and means for supplying a current return path from the current supplying means to the voltage and current supplied circuit comprising at least a pair of unilateral conducting devices each one of which is connected to the same ends of said current supply means as the meter, and bias means for said unilateral conducting devices for biasing them each in a direction such that all current supplied to the tube passes through the meter.

5. An apparatus of the class described including a rectifier having a cathode and a pair of anodes, an alternating current supply means and separate means connected to said anodes and arranged to be energized by said alternating current supply means for supplying alternating current thereto, means for energizing said supply means with alternating current so that the anodes are conductive alternately, an indicating meter connected across the other ends of said supply means, a pair of rectifying means each one of which is connected to a discrete end of each of said supply means, and means to bias said rectifier means for conduction in alternate phase relationship to cause currents flowing alternately through said rectifier to flow from the respective supply means in opposite directions through said meter and means for supplying an alternating current signal to a tube under test.

6. A dynamic mutual conductance tube testing device including means for supplying anode voltage to the anode of a tube under test comprising a rectifier having its cathode connected to said anode, said rectifier having a pair of anodes, alternating current supply means to supply current to each of said anodes comprising a pair of transformer windings and a common source of alternating current connected thereto and arranged to provide alternating current voltage to each of said anodes of the rectifier with the voltages on each anode being in opposite phase to each other, means connected to the opposite ends of each of said windings comprising a pair of diodes each having a cathode and an anode and each having its cathode connected to the end of one of said windings and their anodes connected together, said tube under test having an emitter element and the anodes of said last mentioned diodes being connected thereto, means biasing each of said last mentioned diodes against conduction from the winding to which it is connected, and meter means connected across the cathodes of said diodes for furnishing a current path to each of said diodes from the other of said windings and alternating current signal connected to the control element of the tube under test.

7. A tester for measuring the dynamic mutual conductance of a tube to be tested having at least an anode, an emitter and a control grid, comprising a current and voltage supply for supplying anode voltage to the tube under test and including a rectifier having its cathode connected to the anode of the tube under test, said rectifier having a pair of anodes and means for supplying current to said anode comprising a pair of windings each having an end connected to one of said anodes and each having its other end connected to the other winding through a current indicating meter, means for connecting the ends of the windings opposite to the connection to the anodes to the emitter of the tube under test comprising a pair of diodes each of which has a cathode connected to the end of a winding, a winding connected between the anodes of said diodes and having a tap connected to the emitter of the tube under test, variable bias means connected between the grid and cathode of the tube under test and means for injecting an alternating current signal between the grid and emitter comprising a winding connected in series between said bias in the grid cathode circuit and common alternating current supply means for energizing all of said windings, the windings at the anodes of the voltage supplying rectifier being in opposite phase relationship and the winding for the anodes of the second diodes having the same phase as the ends connected to the cathode and the voltage supplied to the grid of the tube under test being in synchronous relationship with the voltage in the other windings.

8. A tester for measuring the plate resistance of a tube to be tested having at least an anode, an emitter and a control grid, comprising a current and voltage supply for supplying anode voltage to the tube under test and including a rectifier having its cathode connected to the anode of the tube under test, said rectifier having a pair of anodes and means for supplying current to said anodes comprising a pair of windings each having an end connected to one of said anodes and each having its other end connected to the other winding through a current indicating meter, means for connecting the ends of the winding opposite to the connection to the anodes to the emitter of the tube under test comprising a pair of diodes each of which has a cathode connected to the end of a winding, a winding connected between the anodes of said diodes and having a center tap connected to the emitter of the tube under test, variable bias means connected between the grid and cathode of the tube under test and means for injecting an alternating current signal in series with the anode supply of the tube under test comprising a winding connected in series with the anode and rectifier and common alternating current supply means for energizing all of said windings, the windings at the anodes of the voltage supplying rectifier being in opposite phase relationship and the winding for the anodes of the second diodes having the same phase as the ends connected to the cathode, and the voltage supplied to the anode of the tube under test being in synchronous relationship with the voltage in the other windings.

9. A dynamic mutual conductance tube tester for an electron discharge tube which has an anode, a cathode and a control electrode, said tube tester comprising means for applying an alternating voltage to the control electrode of the tube under test, voltage supply means for applying a voltage of one sign across the anode and cathode of the tube under test and including a current measuring circuit connected to measure the anode current of the tube under test, said current measuring circuit including a meter, first rectifier means connected between the anode of the tube under test and one of the terminals of said meter with the positive electrode of said first rectifier means connected to said one meter terminal, second rectifier means connected between the anode of the tube under test and the opposite terminal of said meter with the positive electrode of said second rectifier means connected to said opposite meter terminal, third rectifier means connected between said one meter terminal and the cathode of the tube under test with the negative terminal of said third rectifier means connected to said one meter terminal, fourth rectifier means connected between said opposite meter terminal and the cathode of the tube under test with the negative terminal of said fourth rectifier means connected to said opposite meter terminal, and means rendering said first and third rectifier means conductive during positive half cycles of the alternating voltage applied to the control electrode of the tube under test to pass the anode current through the meter in one direction and rendering said second and fourth rectifier means conductive during negative half cycles of the alternating voltage applied to the control electrode of the tube under test to pass the anode current through the meter in the opposite direction.

10. A device for testing a current translating device which has positive and negative electrodes and a control electrode, said testing device comprising means for applying a fluctuating control voltage to the control electrode of the current translating device under test, voltage supply means connected across the positive and negative electrodes of the current translating device under test to pass current of one sign to said positive electrode and including a current measuring circuit for measuring said current, said current measuring circuit including a meter, a first pair of unilateral conducting means connected respectively between the terminals of the meter and the positive and negative electrodes of the current translating device under test to pass said current of one sign in one direction through the meter, a second pair of unilateral conducting means connected respectively between the terminals of the meter and the positive and negative electrodes of the current translating device under test to pass said current of one sign in the opposite direction through the meter, and means rendering said pairs of unilateral conducting devices conductive alternately during alternate fluctuations of the control voltage applied to the control electrode of the tube under test to pass said current of said one sign through the meter alternately in opposite directions.

11. A tube testing device including means for supplying anode current to a tube being tested including rectifier means for supplying current of one sign to the tube under test, an alternating current supply means, means energized by said alternating current supply means connected to said rectifier to supply alternating current to the rectifier in opposite phase relationship, and means connecting said supply means to the emitting element of the tube under test comprising separate unilateral conducting means each having one end connected to said supply means and having its other end connected to said emitting element, and meter means connected across said one ends of the unilateral conducting means and means for supplying an alternating current signal to the control element of the tube under test.

References Cited in the file of this patent

UNITED STATES PATENTS

| | | |
|---|---|---|
| 1,929,216 | Pfannenmuller | Oct. 3, 1933 |
| 1,999,858 | Barnhart | Apr. 30, 1935 |
| 2,117,462 | Thal | May 17, 1938 |
| 2,201,764 | Eltgroth | May 21, 1940 |
| 2,440,607 | Hickok | Apr. 27, 1948 |